Aug. 14, 1945.  M. WATTER  2,382,358
STRESSED SKIN AIRFOIL JOINT
Filed Feb. 3, 1944  2 Sheets-Sheet 1
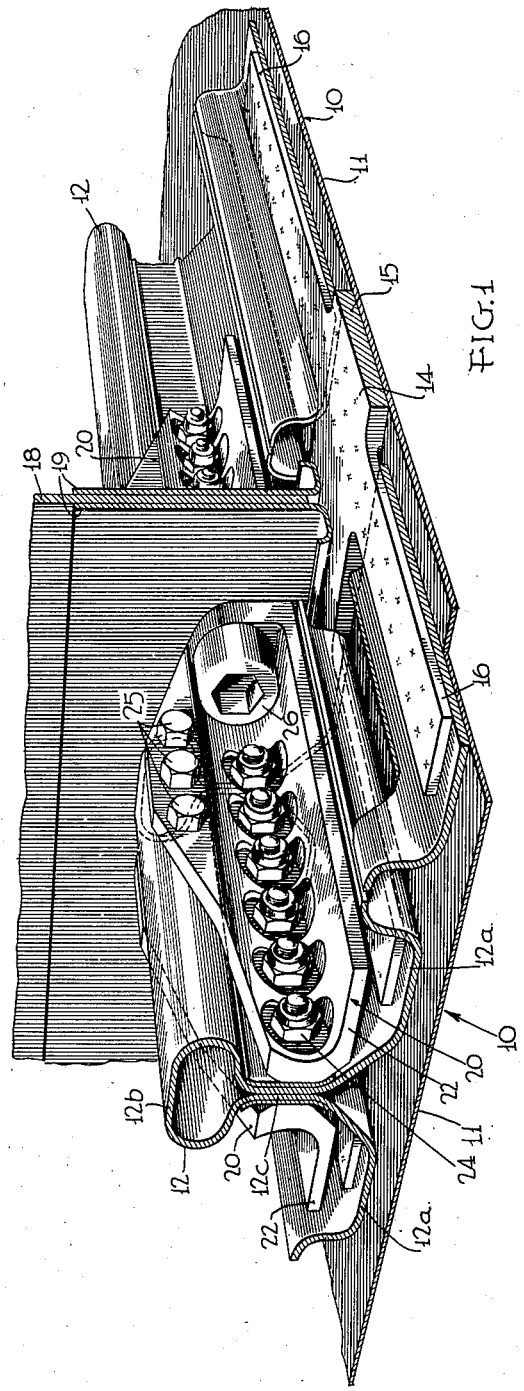
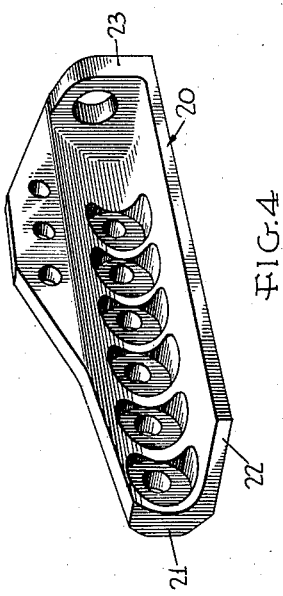
INVENTOR
Michael Watter.
BY John P. Tarbox
ATTORNEY Aug. 14, 1945.    M. WATTER    2,382,358
STRESSED SKIN AIRFOIL JOINT
Filed Feb. 3, 1944    2 Sheets-Sheet 2

INVENTOR
Michael Watter.
BY John P. Tarbox
ATTORNEY

Patented Aug. 14, 1945

2,382,358

UNITED STATES PATENT OFFICE 2,382,358

STRESSED SKIN AIRFOIL JOINT

Michael Watter, Philadelphia, Pa., assignor to Edward G. Budd Manufacturing Company, Philadelphia, Pa., a corporation of Pennsylvania Application February 3, 1944, Serial No. 520,862

7 Claims. (Cl. 244—131)

This invention relates to stressed skin airfoils and has for an object the provision of improved means for joining together two adjacent reinforced skin sections.

The structure of the present application is an improvement for certain uses upon the structure disclosed in the copending application of Michael Watter, Serial No. 385,235, filed March 26, 1941.

One of the particular objects of the invention is to provide joining means for the ends of reinforced skin coverings which have overhanging stringer elements.

Another object is to provide joining means which is associated through a rib web with the ends of similar reinforced skin coverings on the opposite sides of the rib.

Another object is to provide joining means which can be introduced about the overhanging stringers without cutting, flattening, or otherwise deforming the stringer members.

The above and other objects of the invention will be evident from the following description of an illustrative embodiment, reference being made to the accompanying drawings, wherein:

Fig. 1 is a perspective sectional view of a blanket rib joint;

Fig. 4 is a perspective of a joint fitting.

Figure 2:
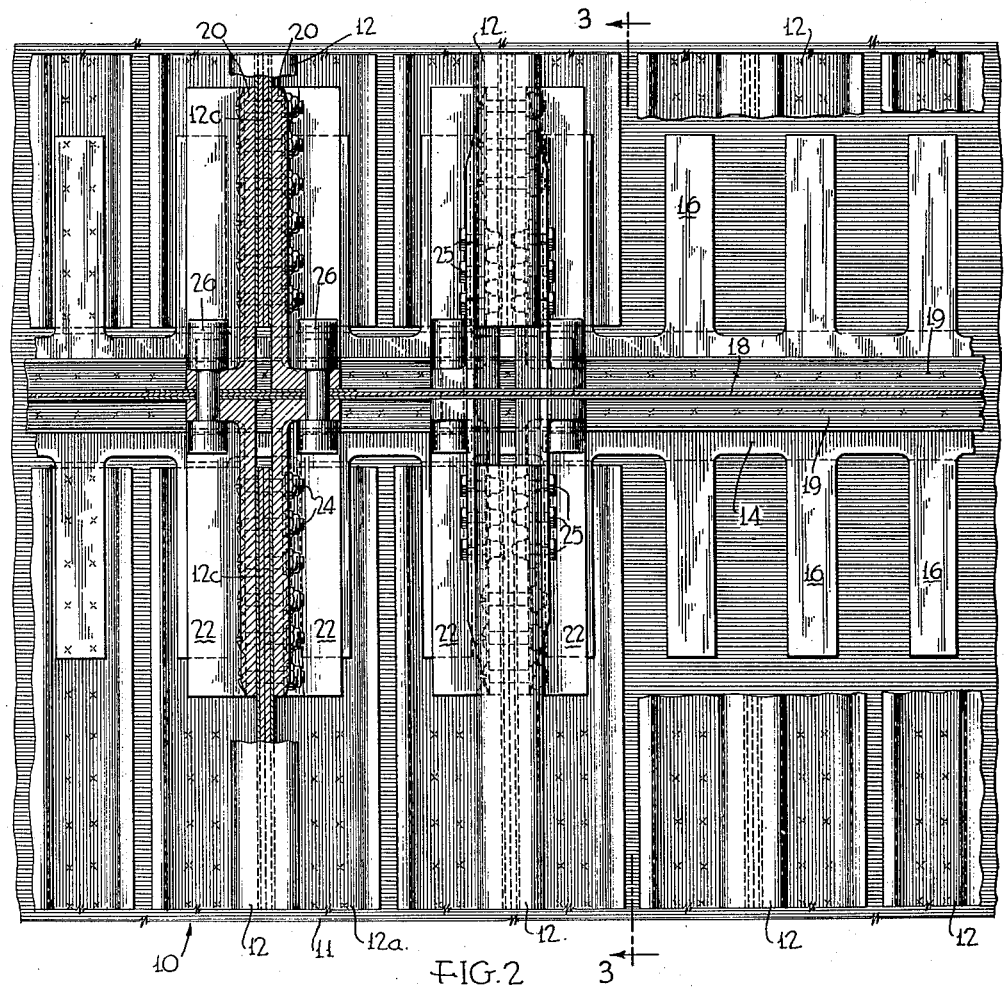
Fig. 2 is a plan section.
Figure 3:
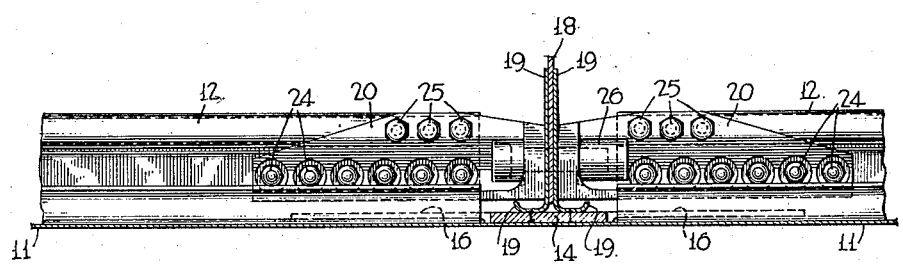
Fig. 3 is a section taken on the line 3—3 of Fig. 2.

The skin blankets 10 which are to be joined each includes a skin 11 and a plurality of stiffening stringers 12 attached thereto, as by welding. The stringers are of the flanged-Y-bulb type wherein the flanges 12a are secured to the skin sheet, as by welding, and the bulb 12b constitutes an overhang beyond the web or stem 12c. Where a joint is to be made the skin sheets 11 extend beyond the ends of the stringers unless it is desired to join the ends of the adjacent sheets by a splice or cover sheet. The skin sheet joint may be reinforced interiorly by a finger plate 14 comprising a thick body strip 15 and fingers 16 which extend out into the spaces within the stringer flanges 12a. In the final assembly the fingers 16 are welded to the skin and flanges.

The joint may be made at any point along the skin blanket but preferably is made above and secured to a rib. Such a rib is shown herein and comprises a web 18 and one or more chords or cap strips 19 welded thereto. The finger plate 14 rests on the tops of the cap strips.

The stringers are connected by joint fittings 20 of corner iron shape having a body side portion 21 shaped to fit the side of a stringer, a side flange 22 parallel with the skin sheet, and an end flange 23 parallel with the rib web. Two fitting members 20, or more properly the two parts of a stringer fitting, are secured to the end of a stringer by bolts 24 passing through the web 12c of the stringer and bolts 25 passing through the stringer bulb walls. Nuts and washers may be preliminarily inserted from the end of the bulb and secured inside ready for use.

The end flanges 23 of the fittings abut the rib here engaging the flanges of the cap strips 19, and are secured together against the side of the rib by bolts 26.

The blanket joint as thus made is very strong and rigid; the stringers require no trimming or flattening; and the fittings can be inserted after the blankets and rib have been brought into final position.

While one embodiment of the invention has been described for purposes of illustration, it is to be understood that there may be various embodiments within the limits of the prior art and the scope of the subjoined claims.

What is claimed is:

1. In an airfoil structure in combination, a skin blanket including a skin sheet and stringers secured thereto, said stringers including laterally overhanging elements at a distance from the skin, and means for connecting the stringers to an adjacent part including fittings conforming to the shape of the side of the stringers, said fittings having end flanges, means connecting the fittings on opposite sides of a stringer together through the stringer, and means connecting the fittings through their end flanges to the adjacent part.

2. In an airfoil structure in combination, a skin blanket including a skin sheet and stringers secured thereto, the stringers being of flanged-Y-bulb shape in section with the flanges secured to the skin sheet, and means for connecting the stringers to an adjacent part including fittings conforming to the shape of the sides of the stringers, said fittings having end flanges, means connecting the fittings on opposite sides of a stringer together through the web and bulb of the stringer, and means connecting the fittings through their end flanges to the adjacent part.

3. In an airfoil structure in combination, adjacent skin blankets each including a skin sheet and stringers secured thereto, a rib web between adjacent skin blankets, the stringers being disposed in end-adjacent relation in pairs at said rib web, fittings on each side of a stringer secured together through the stringer, said fittings having end flanges, and means securing the end flanges of the fittings on the same side of the end-adjacent stringers together through the rib web.

4. In an airfoil structure in combination, adjacent skin blankets each including a skin sheet and stringers secured thereto, the stringers having laterally overhanging portions spaced from the skin sheet, a rib web plate between adjacent skin blankets, the stringers being disposed in end adjacent relation in pairs at said rib web plate, fittings on each side of a stringer secured together through the stringer, the fittings having end flanges abutting the rib web plate, and means securing the end flanges of the stringer fittings on the same side of the end-adjacent stringers together through the rib web plate.

5. In an airfoil structure in combination, adjacent skin blankets having aligned stringers secured to skin sheets, a rib web plate between the ends of the stringers, a joint plate above the web plate secured to the skin sheets, the stringers being of flanged-Y-bulb shape with their flanges secure to the skin sheets, and a corner-shaped fitting on each side of a stringer end having one side conforming to the sides of the stringer web and bulb, having an end flange parallel with the rib web plate and a lateral flange parallel with and spaced from the skin sheet, bolts passing through the sides of both fittings of a stringer and the stringer web and bolts passing through the sides of the fittings and the sides of the bulb to retain the fittings on the stringer, and bolts passing through the end flanges of opposed fittings and through the rib web plate to secure the blankets and rib together.

6. In an airfoil structure in combination, adjacent end-abutting skin sheets, stringers having base flanges secured to each skin sheet, outer portions spaced from the skin sheet, and having their axes directed toward and their flatwise ends spaced from the meeting line of the skin sheets, a joint finger plate secured to the skin sheets between the stringer ends and having projections overlying and secured to the stringer flanges, and means connecting the outer portions of the stringers above their flanges together.

7. In an airfoil structure in combination, a skin blanket including a skin sheet and stringers secured thereto, said stringers including a flange secured to the skin sheet, a web portion extending away from the skin sheet, and a laterally overhanging portion at a distance from the skin sheet, and means for connecting the stringers to an adjacent part including fittings on opposite sides of the stringers conforming to the shape of the side of the web and overhanging portion of the stringer, said fittings having end flanges, means connecting the fittings on opposite sides of a stringer together through the web and through the overhanging portion of the stringer, and means connecting the fittings through their end flanges to the adjacent part.

MICHAEL WATTER.